United States Patent [19]

Knopp

[11] 4,436,682
[45] Mar. 13, 1984

[54] ROLL COMPACTING OF POLYMER POWDERS INTO FULLY DENSE PRODUCTS

[75] Inventor: Walter V. Knopp, Wyckoff, N.J.

[73] Assignee: Revere Copper and Brass, Inc., New York, N.Y.

[21] Appl. No.: 320,432

[22] Filed: Nov. 12, 1981

Related U.S. Application Data

[63] Continuation-in-part of Ser. No. 216,646, Dec. 15, 1980, abandoned.

[51] Int. Cl.$^3$ ............................................... B28B 1/08
[52] U.S. Cl. ..................................... 264/70; 264/123; 264/126; 264/291
[58] Field of Search ................... 264/123, 126, 291, 70

[56] References Cited

U.S. PATENT DOCUMENTS

| | | | |
|---|---|---|---|
| 2,067,025 | 1/1937 | Schmidt | 264/171 |
| 2,920,349 | 1/1960 | White | 264/175 |
| 3,285,442 | 11/1966 | Tigner | 264/70 |

Primary Examiner—James R. Hall
Attorney, Agent, or Firm—Pennie & Edmonds

[57] ABSTRACT

A flowable thermoplastic polymer powder is fed to the nip of a pair of cooperatively rotating compression rolls whereupon the polymer feed is passed between the rolls which compact and cause the particles to coalesce into a shaped article which thereupon emerges from between the rolls in the form of a sheet or film. During the operation, the circumferential speed of the rolls is maintained essentially equal to the linear speed of the sheet or film exiting therefrom. The sheet or film is withdrawn from between the rolls under tension at a force which is adjusted so as not to exceed the elastic limit of the resulting sheet or film product. Flowable thermosetting polymer powder is also compacted into fully dense products by feeding the powder to the nip of a pair of cooperatively rotating compression rolls, whereupon the polymer feed is passed between rolls which compact and cause the particles to cold weld.

6 Claims, 6 Drawing Figures

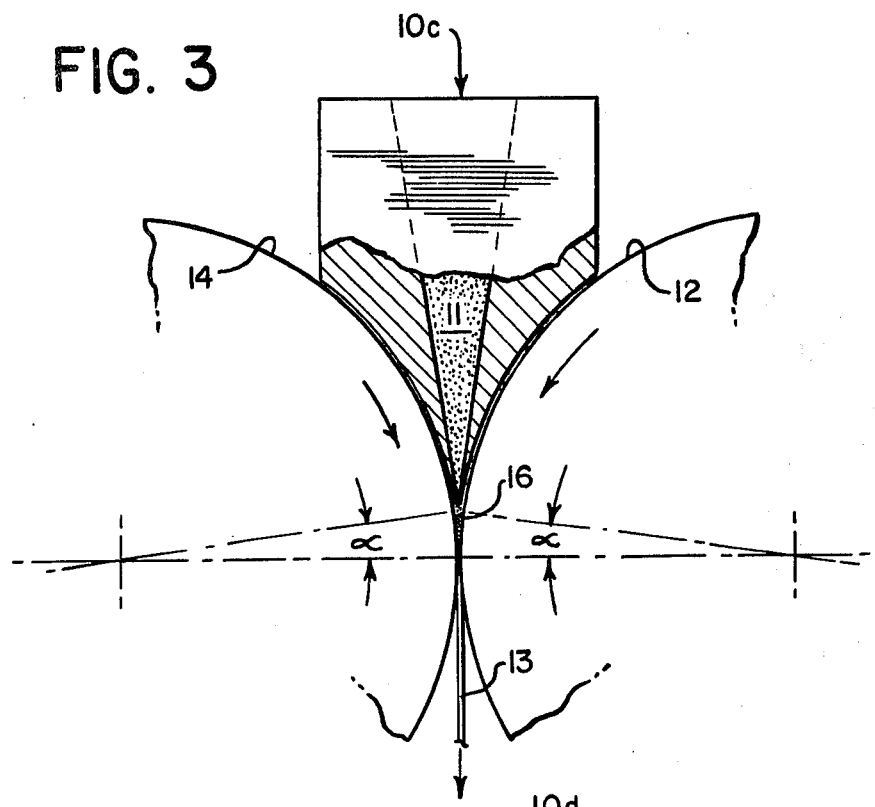
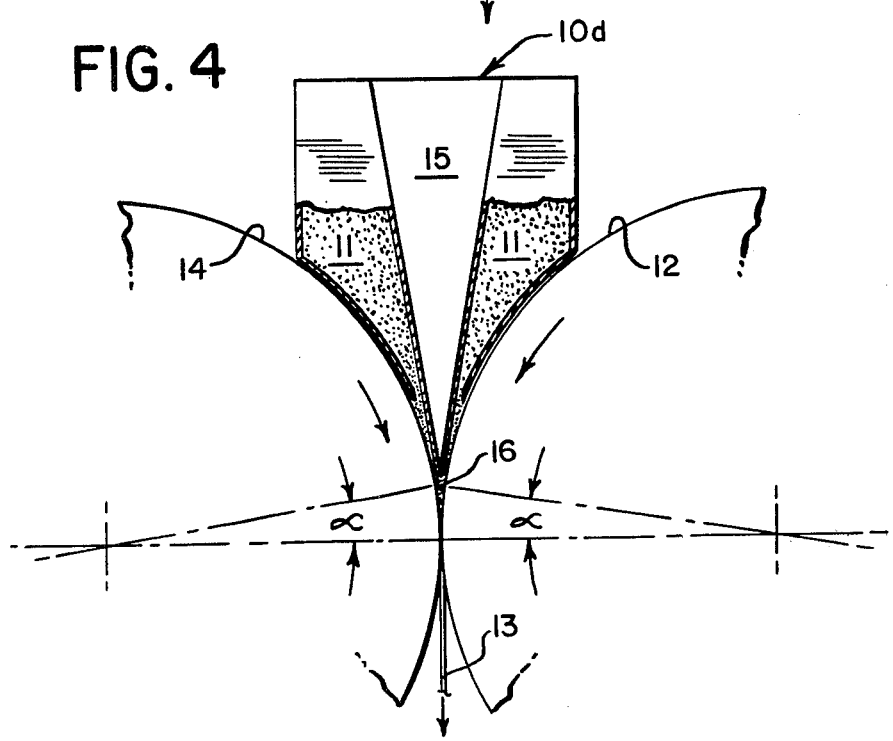

ROLL COMPACTING OF POLYMER POWDERS INTO FULLY DENSE PRODUCTS

DESCRIPTION

This is a continuation-in-part of U.S. patent application Ser. No. 216,646, filed Dec. 15, 1980 now abandoned.

TECHNICAL FIELD

This invention relates to the formation of polymer sheets and films directly from polymer powder by continuous compaction rolling, and to the products obtained thereby.

BACKGROUND ART

Conventional methods for fabricating thermoplastic polymeric materials into shaped articles include extrusion, casting, injection molding and other hot-forming techniques. These techniques commonly involve three basic steps: (1) melting or softening the thermoplastic material; (2) shaping the molten or softened polymer with or without pressure in a mold cavity, in a press or through a die; and (3) cooling the shaped article in its final shape. However, this procedure becomes cumbersome when processing thick sections and is totally unsuitable when working with very viscous, ultra-high molecular weight polymers or those with very high melting points. On the other hand, interest in these two latter categories of thermoplastics is growing rapidly because of their unique thermal and mechanical properties.

Cold-forming, i.e., shaping a material below its melting point, is a processing technique that has been well developed in metallurgy but only recently applied in the field of polymers. Most of these recent polymer applications involve stamping and forging, machining, deep drawing, cold rolling, or cold extrusion. In all these processes, a starting material in the shape of a sheet or billet of relatively thick cross-section is required, which is itself usually prepared by hot extrusion. The combination of hot-forming followed by cold-forming and, in the case of machining, production of scrap which may or may not be reusable, adds to the cost of the overall shaping operation and represents a significant engineering and economic drawback. Nevertheless, there are considerable incentives to applying cold-forming techniques to shaping thermoplastics. For instance, parts are shaped entirely in the solid state, and since there is therefore no phase change which would otherwise cause shrinkage and distortion, adherence to strict dimensional tolerances is facilitated. Also, enhancement of certain engineering properties of the material is often realized.

Generally, for a thermoplastic polymer material to be formable in the solid phase, it must have ductility and strength. Materials of this type which have been cold formed include acrylonitrile-butadiene-styrene copolymers (ABS resins), cellulose acetate-butyrate, polycarbonates, polysulfones, polyvinylchloride (PVC) and polyolefins (e.g., high molecular weight, high density polyethylene). Most such forming operations take place 10°-20° C. below the melting point or glass transition temperature of the polymer.

Powder processing technology has been fully developed for metals, where it has in many instances shown itself to be more attractive than hot forging and melt processing, i.e., casting. In the polymer field, however, only a relatively few investigations, of a preliminary nature, have been made, as exemplified in the following publications:

D. M. Bigg, "High-Pressure Molding of Polymeric Powders," 33rd Annual Technical Conference, Society of Plastics Engineers, p. 472 (1975);

M. A. Rudner, "Fluorocarbons" (Reinhold 1958);

G. W. Halldin and I. L. Kamel, "Powder Processing of Ultrahigh Molecular Weight Polyethylene, I. Powder Characterization and Compaction," Polymer Engineering and Science, 17(1), 21 (1977);

G. W. Halldin and I. L. Kamel, "Powder Processing of Ultrahigh Molecular Weight Polyethylene, II. Sintering," 35th Annual Technical Conference, Society of Plastics Engineers, 298 (1977);

G. S. Jayaraman, J. F. Wallace, P. H. Geil and E. Baer, "Cold Compaction Molding and Sintering of Polystyrene," Polymer Engineering and Science, 16(8), 529 (1976);

U.S. Pat. No. 2,067,025 (1937) to Schmidt for "Method of Transforming Polymerized Vinyl Chloride Into Thin Sheets and Product Obtainable Thereby";

U.S. Pat. No. 2,528,529 (1950) to Lyon for "Method Of and Apparatus For Forming Plastic";

U.S. Pat. No. 2,920,349 (1960) to White for "Polyethylene Films"; and

U.S. Pat. No. 2,928,133 (1960) to Schairer for "Method Of Producing Sheet Material."

Specialty polymers such as ultra-high molecular weight polyethylene (UHMW-PE), poly(tetrafluoroethylene) and poly(benzimidazole) are receiving increasingly greater attention because of their unique mechanical and/or thermal properties. Unfortunately, these properties also limit the processability of such polymers by conventional hot- and cold-forming techniques. On the other hand, powder-forming techniques would seem to offer attractive alternatives to the problem of shaping such materials. As indicated previously, conventional powder processing has been used to a very limited extent for shaping thermoplastic polymers but has not been proven capable of widespread commercial applicability. A need therefore exists for improved powder processing techniques which can take full advantage of the properties of polymers in general and the unique properties of the aforesaid specialty materials in particular, to produce non-tearable, thin film and sheet at high overall rates of production.

Accordingly, it is an object of the present invention to provide new processes for producing shaped articles in the form of films directly from thermoplastic polymer powders.

Another object is to provide shaped thermoplastic articles in the form of films having improved properties and which have been formed directly from thermoplastic polymer powders.

Yet another object is to provide an apparatus for producing shaped articles in the form of films directly from thermoplastic polymer powders.

These and other objects of the invention, as well as a fuller understanding of the utility and advantages thereof, can be had by reference to the following disclosure and claims.

DISCLOSURE OF THE INVENTION

The foregoing objects are achieved according to the present invention by the discovery of a process whereby powdered thermoplastic polymer material to be shaped is continuously fed from a hopper to the gap between a pair of heated work rolls. The material is thereby compacted into a sheet or film having the desired thickness.

The process of the invention comprises feeding a flowable thermoplastic polymer powder to the nip of a pair of cooperatively rotating compression rolls whereupon the polymer feed is passed between the rolls which compact and cause the particles to coalesce into a shaped article which thereupon emerges from between the rolls in the form of a sheet or film. During the operation, the circumferential speed of the rolls is maintained essentially equal to the linear speed of the sheet or film exiting therefrom. The sheet or film is withdrawn from between the rolls under tension at a force which is adjusted so as not to exceed the elastic limit of the resulting sheet or film product.

In another aspect of the invention, there is provided an apparatus for producing shaped articles in the form of sheet or film directly from thermoplastic polymer powders which comprises a pair of compression work rolls adapted to rotate cooperatively to compact and coalesce the polymer powder within the nip of the rolls. The apparatus includes a drive means for cooperatively rotating the rolls and a hopper for receiving and feeding the polymer powder to the nip of the rolls at a predetermined rate. In one embodiment of the invention, the hopper is adapted so as to keep the polymer powder feed physically and thermally isolated from the work roll surfaces prior to delivery of the powder to the nip of the rolls. Means are also provided for withdrawing the sheet or film from the nip of the work rolls and applying tension on said sheet or film at a force so as not to exceed the elastic limit thereof.

Polymers suitable for use in the present invention are film forming thermoplastic polymers, such as linear polyolefins (e.g., polyethylene, polypropylene), polyamides, polyhalo-olefins (e.g., polyvinyl chloride), perfluoro polymers (e.g., polytetrafluoroethylene), acrylonitrile-butadiene-styrene, polycarbonates, polysulfones, and cellulose esters (e.g., cellulose acetate, diacetate, and triacetate). The polymer powder feed is desirably of a uniform particle size. The polymer can be a single polymer or a plurality of polymer compositions either in mutual admixture or in stratified layers as described herein below. The powder must be free flowing, which dictates the minimum particle size; the upper limit of particle size is dictated by the thickness of the sheet or film desired.

In another aspect of the invention, I have found that under some rolling conditions, thermosetting polymer materials can be processed to form continuous sheets. Unlike thermoplastic polymers, thermosetting polymers do not coalesce and resolidify after application of heat. However, I have found that thermosetting polymer powders can be cold welded by roller pressure at slightly elevated temperatures.

The process of the invention for thermosetting plastic resins is carried out at a temperature sufficiently high to aid in the cold welding between contact points of particles. In one example, 75% by weight of phenolic resin manufactured by Hooker Chemicals under the trademark "Durez" was mixed with 25% by weight of yellow pine particles having a mesh size of $-80$. The admixture was rolled at a temperature of 225° F. (about 124° C.). In another example, 75% by weight of urea-formaldehyde manufactured by American Cyanamid under the "Bettle" trademark was mixed with 25% by weight of particles of yellow pine wood particles having a $-80$ mesh size. The admixture was rolled at a temperature of 240° F. (about 116° C.).

The process of the invention for thermoplastics is carried out at a temperature which is below the melting point but high enough to ensure coalescence and optimal tensile strength of the film. The temperature of the thermoplastic feed material is controlled by the temperature of the work rolls, which are uniformly heated so that the desired temperature is maintained uniformly throughout the polymer feed in the gap between the rolls. The temperature at which the work rolls are heated to achieve a given temperature of the polymer feed will depend upon the circumferential speed of the drive rolls; the faster the speed, the higher the temperature of the rolls, and vice versa.

In addition to temperature, certain other factors determine the outcome of the process. Thus, the pressure exerted by the work rolls should be controlled so as to be sufficiently high to achieve complete densification (i.e., a density which corresponds essentially to the maximum density of the material in bulk form) of the product and optimize its strength. The rate at which the polymer powder is fed to the work rolls is adjusted to match the roll pressure and film thickness consistent with full densification of the product. The work rolls are operated preferably at the same circumferential speed which is adjusted to match the other parameters. Generally, the maximum work roll speed is determined by the requirement that the polymer powder feed be heated uniformly to the desired temperature by the time it enters the nip of the work rolls; the lower limit of the work roll speed is determined primarily by the production rate desired.

The invention is suitable for producing polymer film or sheets having a wide range of desired thicknesses directly from the polymer powder. The process is especially suited to producing films or sheets having a uniform predictable thickness of between 0.0025 and 0.050 inch. The product is withdrawn from the work rolls at a take-off tension which permits the establishment of a "neutral point," i.e., a state of affairs where the linear or circumferential speed of the rolls equals the speed of the material exiting the nip of the work rolls.

For purposes of the present disclosure the "entry arc" is the arc in the circumferential portion of the work roll surface attenuated by the nip angle. The entry arc is thus a function of the diameter of the work roll. It affects the amount of feed material pulled into the "roll gap" which is the region between the work rolls immediately preceding the entry arc. The amount of material pulled into the entry arc will determine the thickness of the film or sheet and its properties. For a given roll diameter, the amount of material that can be drawn into the entry arc will be constant. By restricting the entry arc for a given roll diameter, one can simulate the performance of a smaller diameter roll. This can be done through appropriate design of the feed hopper which in effect controls the thickness of the powder material between the entry arcs of the work rolls. The need to regulate such feed thickness would occur, for example, in situations where the feed material is a mixture of powders differing in density (e.g., in the case of two or more polyolefins) and it is desired to achieve the same product density.

With respect to the work roll surfaces, the coarser the surface, the more polymer power will be pulled into the nip of the rolls. Generally, the work roll surfaces have a degree of smoothness such that the surface irregularities vary from 1 to 10 micro inches, and preferably from 4 to 6 micro inches. The work roll surfaces can be provided with a slight convex crown, although the feature of crowned work rolls is not essential to the practice of the invention. For example, when forming a 6-inch wide 0.005-inch thick UHMW-PE sheet using 1-foot long 6-inch diameter stainless steel work rolls, a 0.0005-inch convex crown would be suitable. The choice of other suitable crowns will depend on factors such as the type of powder being rolled, the thickness of the film produced, the speed and pressure of the work rolls, and temperature. The application of these factors in choosing a crown will become apparent to those skilled in the art having the benefit of the present disclosure before them.

BRIEF DESCRIPTION OF THE DRAWINGS

Further details of the invention and its preferred embodiments can be had by reference to the accompanying drawings, wherein:

FIGS. 3 and 4 are partial elevational views of rolling mill designs similar to those shown in FIGS. 1 and 2, illustrating different constructions of the feed hopper.

In the drawings, the same structural elements are designated by the same reference numerals. Letter suffixes are added to denote specific ones of these elements where necessary.

BEST MODE FOR CARRYING OUT THE INVENTION

In the following discussion of the drawings and in the subsequent examples, a powdered thermoplastic polymer material to be shaped is continuously supplied from a hopper to a gap between a pair of heated, cooperatively rotating compaction work rolls. The material is compacted by the rolls under heat and pressure into a sheet of film having the desired thickness or caliper. The material can be a polymer such as polyethylene or polypropylene whose particle size can range from about 30 U.S. mesh to about a 325 U.S. mesh. Preferably, the material is an ultra-high molecular weight polyethylene (UHMW-PE) powder.

Figure 1:
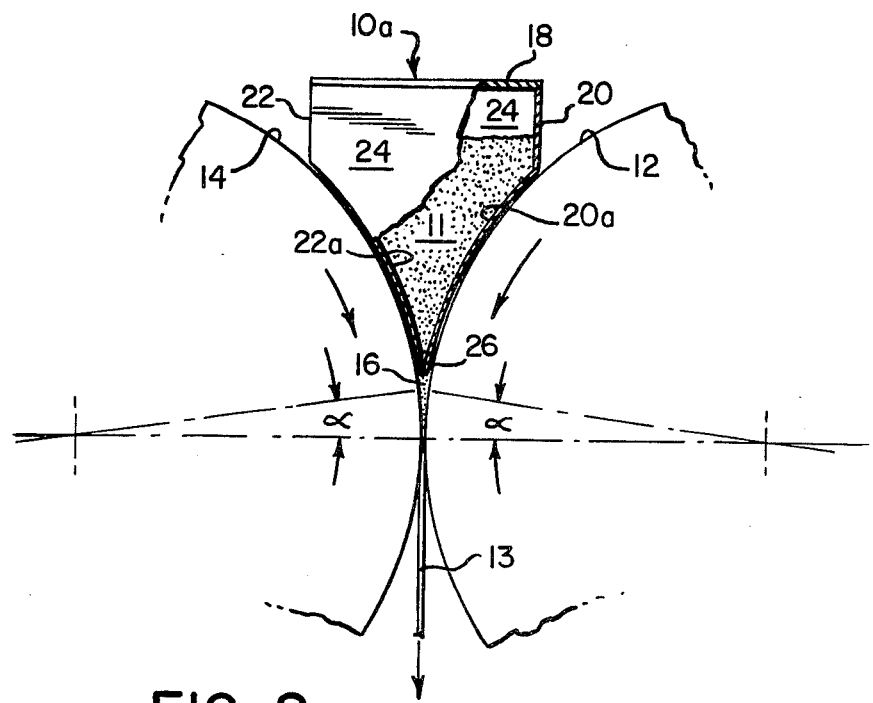
FIGS. 1 and 2 are partial elevational views of two different compaction rolling mills according to the invention, each of which includes a pair of work rolls and a feed hopper to supply the rolls with and continuously meter material in the manufacture of a thermoplastic polymer film.
Figure 2:
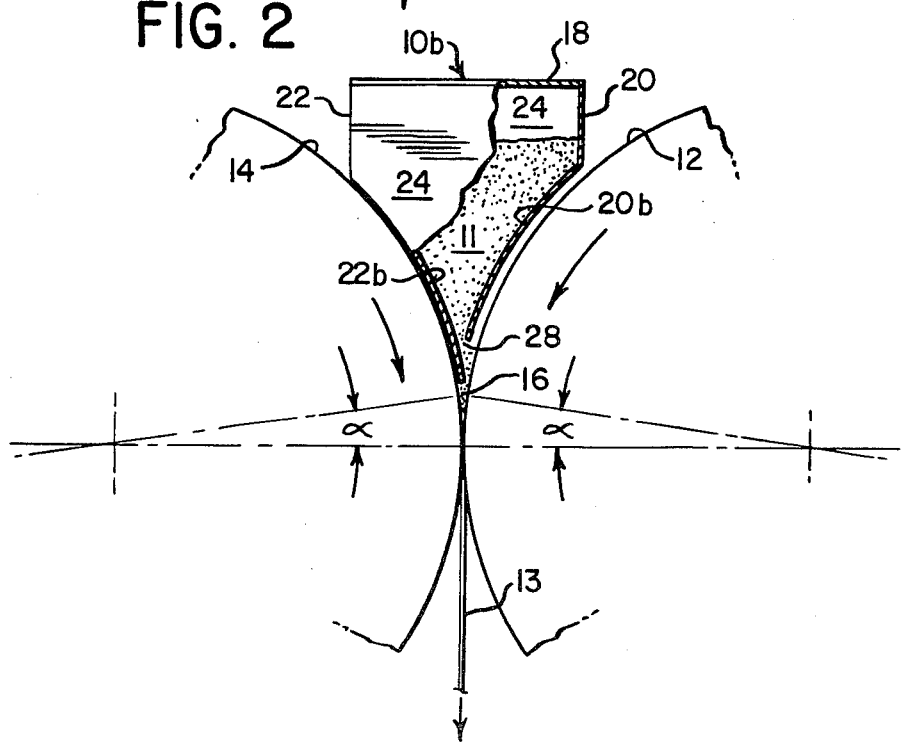

Referring to FIGS. 1 and 2, compaction work rolls 12 and 14 are mounted for movement rotationally on parallel shafts (not shown) and are driven by drive means (not shown) in the direction of the arrows toward gap 16. Rolls 12 and 14 are disposed parallel to one another in a common horizontal plane to locate gap 16 vertically above the nip of the rolls. Rolls 12 and 14 are driven preferably at the same linear rotational (i.e., circumferential) speed.

The drive means can comprise any structure or device which is conventional in the rolling art, such drive means being connected to the shaft of each roll so as to permit relative adjustment of rolls 12 and 14 at gap 16.

Preferably, rolls 12 and 14 are located to provide a nip angle $\alpha$ of about 7°–8°.

Rolls 12 and 14 are capable of exerting a predetermined compacting pressure in order to achieve a sheet or film 13 by direct compression rolling of the powder material 11. The rolls 12 and 14 can be of any convenient diameter. However, the diameters of rolls 12 and 14, which are preferably the same, is one of several parameters which directly affects the thickness of the resulting sheet or film 13. A roll diameter of 6-inches has been used successfully in carrying out a direct compression rolling of polymer powder, and rolls having a larger diameter have also been used successfully. The linear speed of rolls 12 and 14, the surface characteristics of the rolls, and the type of material fed to the region of gap 16, are additional parameters that directly relate to the thickness of the sheet or film 13. For example, and as a general proposition, the greater the diameter of rolls 12 and 14, the coarser the surface characteristics of the rolls and the greater the volume of material supplied to the region of gap 16, then the greater will be the thickness of the sheet or film 13 obtained. With respect to the rotational speed of the rolls 12 and 14, if the speed of rotation is increased, other parameters remaining constant, then the thickness of the sheet or film 13 is reduced.

Work rolls 12 and 14 are of a length as may be required in the manufacture of sheet or film to comply with product width considerations. For example, rolls 12 and 14 can be of a length sufficient to permit the manufacture of a sheet or film 13 having a width of about 5–6 feet. Additionally, rolls 12 and 14 or at least an outer annulus thereof, are advantageously formed of a material having good heat-conductance. A preferred material for this purpose is cast steel when the process is carried out at temperatures not exceeding 350° F. (177° C.), and high temperature steel when higher temperatures are employed.

As indicated, the process of the invention includes heating the particulate feed material 11 and compression rolling it between the rolls 12 and 14. Each of the rolls 12 and 14 can be cored or otherwise formed to receive a heating element (not shown) capable of being controlled to a temperature or within a range of temperatures. Any form of conventional heating element and control can be employed, such as a heated fluid circulating within the rolls so as to maintain the surfaces of the latter at a uniform temperature.

The present invention contemplates several constructions of hopper 10a. Each hopper serves as a store for the material 11 which is supplied continuously to the region of gap 16. Hopper 10a can be adapted to receive feed material 11 by means (not shown) at a rate substantially equal to the rate at which the material is supplied to gap 16 so as to maintain the store of material at a desired level within the hopper. In the form shown in FIG. 2, hopper 10a includes an upper surface 18 to which a structure for supply of material 11 can be attached, and a first pair of side walls 20 and 22. These side walls extend toward rolls 12 and 14 along substantially their full length. A second pair of side walls, including an end wall 24 and a wall at the opposite end (not shown) complete the hopper 10a, thereby defining in cross-section a more or less rectangular enclosure. The last-mentioned end walls are contoured substantially to the contour of the rolls 12 and 14 to prevent loss of material 11. Referring to FIGS. 1 and 2, side walls 20 and 22 include wall portions 20a, and 22a (FIG.

1) and 20b, 22b (FIG. 2) of contoured outline, substantially concentric with the surface of rolls 12 and 14, so as to extend toward gap 16. As shown in FIG. 2, wall portions 20a and 22a are substantially coextensive and, together with the end wall 24 (and the opposite end wall not shown) form a metering outlet 26 at the rim. Metering outlet 26 is in the form of a rectangular slit. The length of the outlet will correspond substantially to that of rolls 12 and 14 to provide a uniform flow of feed material 11 to gap 16 along that length. The width of outlet 26 can be on the order of about 0.06 inch to meter the flow of material 11. In the form shown in FIG. 1, the material 11 exits hopper 10a in a free falling stream along a path generally following a line tangent to rolls 12 and 14.

FIG. 2 illustrates a somewhat similar hopper construction including a pair of wall portions 20b, 22b. One of the wall portions, for example the wall portion 22b, is longer than the other wall portion 20b, thereby forming an outlet 28 defined by the rims of each wall portion between the end wall 24 and the opposite side wall (not shown). The outlet in the construction of hopper 10b of FIG. 2 can be dimensioned so as to duplicate substantially the dimensions of the outlet of the hopper 10 of the construction of FIG. 1. However, because of the location of outlet 28 to provide a differential opening, a metered flow of material 11 will be thrown or biased against the surface of work roll 12. The powder material 11 thus thrown will cascade against the surface of work roll 12, thereby increasing the contact time.

The design of the hopper must provide several functions. For instance, the hopper must confine the feed material 11 while at the same time providing an outlet which suitably meters the material to the gap within which the material is heated. In FIG. 1, the material 11 is heated through convection, i.e., exposing the thin falling stream of material to the heat emanating from rolls 12 and 14, while in FIG. 2, heat is acquired by direct contact between the material and the surface of the roll onto which it is "thrown." In these forms, the construction of the hopper not only prevents loss of material 11 from the sides, it also serves in the manufacture of a sheet or film 13 of less thickness than would otherwise be obtained. To this end, the hoppers of FIGS. 1 and 2 meter or restrict the amount of material 11 supplied to gap 16. The form of hopper 10b of FIG. 2 permits the rotational speed of rolls 12 and 14 to be increased since the material 11 is capable of being heated more rapidly because of direct contact between the material and the rolls 12 and 14.

FIG. 3 shows one form of generalized hopper design according to the invention for feeding polymer powder to the roll gap 16 for compacting. The hopper 10c is so designed to prevent the powder 11 from touching the rolls 12 and 14 while metering an amount of powder that will produce a thin sheet 13. The amount of powder material 11 is small enough so that there is good heat transfer from the rolls 12 and 14 to the powder. This system also allows a faster production rate for thin sheet.

FIG. 4 shows a hopper design according to the invention for making thicker polymer strip. In this embodiment the powder 11 is allowed to contact work rolls 12 and 14. The surface contact area could extend up to the top of the rolls if desired. In such circumstances, the center 15 of hopper 10d does not contain powder. If the center contained powder, it would allow powder into the gap 16 that is not high enough in temperature. The rolls 12 and 14 would pull powder into the gap on the surface of the rolls which has been heated by its contact. Powder would also be pulled into the gap from the center which has a lower temperature. By eliminating the center zone, this undesirable condition is eliminated.

The hopper as shown in FIG. 4 may be used with different powder compositions in each partitioned section to achieve a stratified or layered rolled sheet final product. Similarly, a partition (not shown) may be installed in the hopper of FIG. 3 to achieve stratification of the final rolled sheet product.

I have found in certain applications that vibrating means (not shown) attached to the hopper will facilitate the flow of the powder or blend to the rolls. This helps to guarantee a more uniform flow of material.

Figures 5A, 5B:
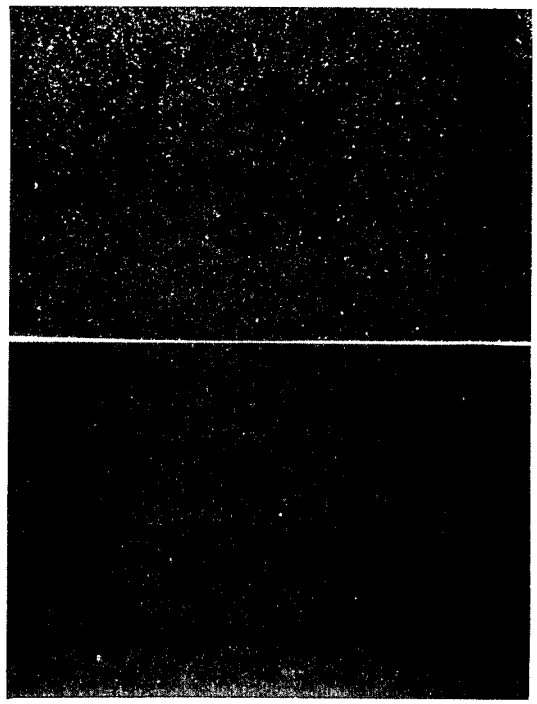
FIGS. 5A and 5B are photomicrographs of polymer sheet material formed according to the invention, and sheet material formed conventionally by skiving from a log of polymer material, respectively.

FIG. 5a is a photomicrograph of polymer sheet material formed by direct compaction rolling of UHMW-PE powder according to the invention. The sample is illuminated from behind and, as can be readily seen, the material is virtually devoid of pin-hole perforations. By contrast, FIG. 5b shows the numerous undesirable pin-hole perforations present in a sheet of the same material and thickness, and back-lit in the same way, but produced by a conventional skiving technique.

The following examples are intended to illustrate, without limitation, the process, apparatus, and product of the invention.

EXAMPLE 1

A quantity of UHMW-PE, having a melting point of about 392°–428° F. (200°–220° C.), (sold by American Hoechst as grade 412 under the "HOSTALEN-GUR" registered trademark) is formed into a sheet of film by passing the material in powdered form to the region of the gap between a pair of cooperating 12-inch long 6-inch diameter work rolls mounted for rotation about parallel, horizontal axes. The work rolls have a 0.0005-inch crown at their centers. The material is then compressed between the rolls which are positioned with a nip angle of 7°–8° and driven at a speed of about 2 ft/min. The material is passed to the region of the gap by a hopper as shown in FIG. 2, heated to a temperature of about 290° to 300° F. (about 143° to 149° C.) and compressed between the rolls so as to form a sheet or film of a thickness of about 0.022 inch and a density of about 0.82 g/cc (substantially fully dense) when drawn from the nip of the rolls at a tension so as to maintain flatness of the material.

EXAMPLE 2

The procedure of Example 1 produces a sheet of film of thinner gage when the rolls are polished with 325 mesh emery cloth (44 micron grit).

EXAMPLE 3

The procedure of Example 1 is repeated except that the speed of the work rolls is increased to about 3.1 ft/min. A sheet of film is produced having a thickness of about 0.011–0.013 inch.

EXAMPLE 4

The material of Example 1 is passed to the region of the gap between a pair of compacting 6-inch diameter work rolls similarly mounted, and providing a like function as the work rolls of Example 1, except that the rolls are driven at a speed of about 11 ft/min. The material is passed to the region of the gap by the hopper of FIG. 2 having a metering outlet extending along the gap with a width of about 0.035–0.040 inch. The material is heated to a temperature of about 290° to 300° F. (about 143° to 149° C.), and compressed and drawn under tension from the nip of the rolls. The resulting sheet of film had a thickness of about 0.005–0.006 inch.

EXAMPLE 5

A quantity of UHMW-PE is formed to a sheet of film by passing the material in powdered form to the region of the gap between a pair of cooperating 6-inch diameter work rolls mounted for rotation about parallel, horizontal axes. The material is then compressed between the rolls which are positioned with a nip angle of 7°–8° and driven at a rotation speed of about 11.0 ft/min. The material is passed to the region of the gap and heated to a temperature of about 255° to 266° F. (about 124° to 130° C.) and compressed to form a sheet of film of a thickness of about 0.021 inch and a density of about 0.66 g/cc when drawn under tension from the nip of the rolls.

EXAMPLE 6

The material of Example 1 is formed into a sheet of film by passing the material to the region of the gap between a pair of cooperating 6-inch diameter work rolls mounted for rotation about parallel, horizontal axes having a nip angle of about 7°–8°. The work rolls are of a diameter of 6 inches and driven at a speed of about 11.0 ft/min. The material is heated within the region of the gap to a temperature of about 284° F. (about 140° C.) and directly roll compacted by the work rolls. The work rolls were preheated to a temperature of about 266° F. (130° C.). The resulting sheet had a thickness of about 0.020 inch and a density of about 0.82 g/cc when drawn from the nip of the work rolls under tension to produce a flat sheet.

EXAMPLE 7

The feed material of Example 5 is heated to a temperature of about 266° F. (about 130° C.) within the gap between compacting, cooperating work rolls, such as the work rolls of Example 7. The work rolls are preheated to a temperature of about 300° F. (about 149° C.). The resulting sheet of film having a thickness of about 0.022 inch and a density of about 0.66 g/cc when drawn under tension to produce a flat sheet.

EXAMPLE 8

The feed material of Example 5 is heated to a temperature of about 266° F. (about 130° C.) within the gap between the compacting work rolls of Example 6. The work rolls were preheated to a temperature of about 300° F. (about 149° C.). The resulting sheet of film has a thickness of about 0.022 inch and a density of about 0.66 g/cc when drawn from the nip of the work rolls and a resulting thickness of about 0.015 inch and a density of about 0.94 g/cc when heated to a melt temperature of about 284° F. (about 140° C.).

EXAMPLE 9

A quantity of polyethylene powder together with ranging percentages of lampblack (6%, 4% and 2% by weight) are fed to a pair of compacting rolls according to the design of the embodiment shown in FIG. 3. The opening at the nip of work rolls 12 and 14 is adjusted to a value of between 0.035 and 0.040 inch. The rolls are operated at a linear circumferential speed of 11 feet/minute and the surfaces thereof are maintained at a temperature of 290°–300° F. (about 139°–145° C.). The sheet material thus produced has a thickness of 0.0035–0.004 inch and a density of 0.94 g/cc. Tension is applied uniformly across the film exiting from the work rolls sufficient to afford a flat material.

EXAMPLE 10

The process of Examples 1–9 can be carried out wherein reinforcing metallic screen material is simultaneously roll compacted with the polymer powder feed material.

The sheets of film can comprise "feed stock" suitable for use in further processing operations.

The particle size of the feed material for the process of Examples 1–9 can be of uniform mesh, but preferably the material will be comprised of a distribution of particles varying in size from relatively coarse to relatively fine particles. To this end, it has been found that the process may be more effectively carried out with material having a non-uniform particle size. A typical distribution of particle size (U.S. mesh) can be as follows:

| Sieve Size | Percent |
| --- | --- |
| −50 + 80 | 2.7 |
| −80 + 100 | 10.8 |
| −100 + 140 | 35.6 |
| −140 + 200 | 37.4 |
| −200 + 325 | 13.2 |
| −325 | 0.3 |

The polymer feed material can contain additional ingredients to alter the appearance and/or properties of the product. Thus, coloring agents and opacifiers such as carbon black, wood powder (e.g., cherry bark, box elder bark, yellow pine, or maple), preferably of −80 mesh size, various types of metal powders (e.g., copper, aluminum), metal oxides (e.g., aluminum oxide), intermetallic compounds (e.g., aluminum silicide), interstitial compounds (e.g., silicon carbide), and ceramic powders (e.g., powdered metal carbides such as tungsten carbide), graphite, or molybdenum disulfide can be incorporated in various amounts with the polymer feed. The added ingredients may be linear (e.g., fibrous) structural elements. Even foaming agents can be added in order to achieve novel bulking structures.

The resulting sheet or film is distinctly different in its properties from extruded, cast, or skived films containing similar adjuvants. Thus, the present films contain these adjuvants uniformly dispersed throughout the coalesced polymer particles whereby the material takes on the properties of the adjuvant material.

INDUSTRIAL APPLICABILITY

The present process and apparatus provide a shaped polymer product which is useful in applications which have been found for previous films, but at high quality and lower cost. In addition, the present invention makes possible the production of polymer films having incorporated therein modifying and adjuvant materials, e.g. metal powders, pigments, wood powder, and the like, which would be extremely difficult or impossible to do by conventional film-forming techniques, thereby giving rise to a host of new applications in the plastic film industry.

The foregoing description and example are presented for the purpose of illustrating the invention and its utility and advantages without intending to limit same in any way to specific features or embodiments. It is understood that changes and variations can be made in the product and process of the invention without departing from the scope thereof as defined in the following claims.

Having thus described my invention, what I claim as new and desire to secure by Letters Patent is:

1. A process for producing a polymer film comprising:
   (a) storing a supply of a polymer powder;
   (b) feeding a free falling stream of the powder between a pair of spaced rollers;
   (c) metering the stream of powder fed between the rollers;
   (d) heating the powder;
   (e) rotating the rollers;
   (f) compressing the powder between the rollers to compact and to coalesce the powder into a film;
   (g) drawing the film from between the rollers;
   (h) maintaining the circumferential speed of the rollers essentially equal to the linear speed of the film drawn from between the rollers; and
   (i) applying tension to the film drawn from between the rollers to produce a flat film.

2. A process according to claim 1 wherein the feeding step includes the step of directing the powder toward the center of the space between the rollers.

3. A process according to claim 1 wherein the feeding step includes the step of directing the powder onto the surface of one of the rollers.

4. A process according to claim 1 wherein the feeding step includes the steps of:
   feeding a first portion of the stream of powder onto the surface of a first roller;
   feeding a second portion of the stream of powder onto the surface of the second roller.

5. A process according to claim 4 wherein the first and second portions of the stream of powder are comprised of different compositions.

6. A process according to claim 1 wherein the storing step includes the step of vibrating the supply of the polymer powder to facilitate feeding the powder between the rollers.

* * * * *

UNITED STATES PATENT AND TRADEMARK OFFICE
CERTIFICATE OF CORRECTION

PATENT NO. : 4,436,682
DATED : March 13, 1984
INVENTOR(S) : Walter V. Knopp

It is certified that error appears in the above—identified patent and that said Letters Patent is hereby corrected as shown below:

Column 3, line 65, "225°F" should read --255°F--.

Signed and Sealed this

Twenty-ninth Day of May 1984

[SEAL]

Attest:

GERALD J. MOSSINGHOFF

*Attesting Officer*  *Commissioner of Patents and Trademarks*